(12) United States Patent
Li et al.

(10) Patent No.: US 10,863,597 B1
(45) Date of Patent: Dec. 8, 2020

(54) SURFACE LIGHT SOURCE DEVICE AND SYSTEM FOR MONITORING UNIFORMITY OF LIGHT FROM SURFACE LIGHT SOURCE DEVICE

(71) Applicant: TRIPLE WIN TECHNOLOGY(SHENZHEN) CO. LTD., Shenzhen (CN)

(72) Inventors: Meng-Qiu Li, Shenzhen (CN); Gang-Jia Li, Shenzhen (CN); Ying-Quan Zhao, Shenzhen (CN); Yen-Sheng Lin, New Taipei (TW)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 16/830,587

(22) Filed: Mar. 26, 2020

(30) Foreign Application Priority Data

Mar. 11, 2020 (CN) .......................... 2020 1 0166364

(51) Int. Cl.
*H05B 45/12* (2020.01)
*F21V 8/00* (2006.01)

(52) U.S. Cl.
CPC ............. *H05B 45/12* (2020.01); *G02B 6/005* (2013.01)

(58) Field of Classification Search
None
See application file for complete search history.

(56) References Cited

U.S. PATENT DOCUMENTS

2010/0259470 A1* 10/2010 Kohtoku .............. G02B 6/0021 345/102
2011/0187942 A1* 8/2011 Cho ........................ G02B 6/002 348/739

\* cited by examiner

*Primary Examiner* — Dedei K Hammond
(74) *Attorney, Agent, or Firm* — ScienBiziP, P.C.

(57) ABSTRACT

A surface light source device and system for monitoring uniformity of brightness of the device are disclosed, the device includes a light source unit; a light guide plate, and at least one light uniformity plate. The light guide plate includes a light incident surface and a light emitting surface, the light incident surface is disposed in a light emitting direction of the light source unit; and the light incident surface is disposed in a light emitting direction of the light source unit. The at least one light uniformity plate comprises a light receiving surface facing the light emitting surface, the light receiving surface is defined with a plurality of zones, and each zone is provided with a photosensitive element which senses and measures the brightness of light. A method of operating the monitoring system is also disclosed.

14 Claims, 5 Drawing Sheets

SURFACE LIGHT SOURCE DEVICE AND SYSTEM FOR MONITORING UNIFORMITY OF LIGHT FROM SURFACE LIGHT SOURCE DEVICE

FIELD

The subject matter herein generally relates to illumination, and more particularly to a surface light source device.

BACKGROUND

LEDs as light source have the advantages of high light efficiency, good optical performance, environmentally acceptable, and long life. LED lighting has gradually become the mainstream of the backlight display market. At present, MTF and SFR performance tests for cameras are mainly using the new type of LED backlight. In order to provide a stable light source and obtain ideal lens imaging quality, it is necessary to monitor the uniformity of brightness of the light source.

A conventional method of monitoring of the uniformity of brightness uses an luminance meter to manually collect luminance information. However, such a method cannot monitor in real time and is prone to artificial reading errors. Therefore, an improved method for monitoring the luminosity of light sources is desired.

BRIEF DESCRIPTION OF THE DRAWINGS

Implementations of the present technology will now be described, by way of example only, with reference to the attached figures.

DETAILED DESCRIPTION

Figure 1:
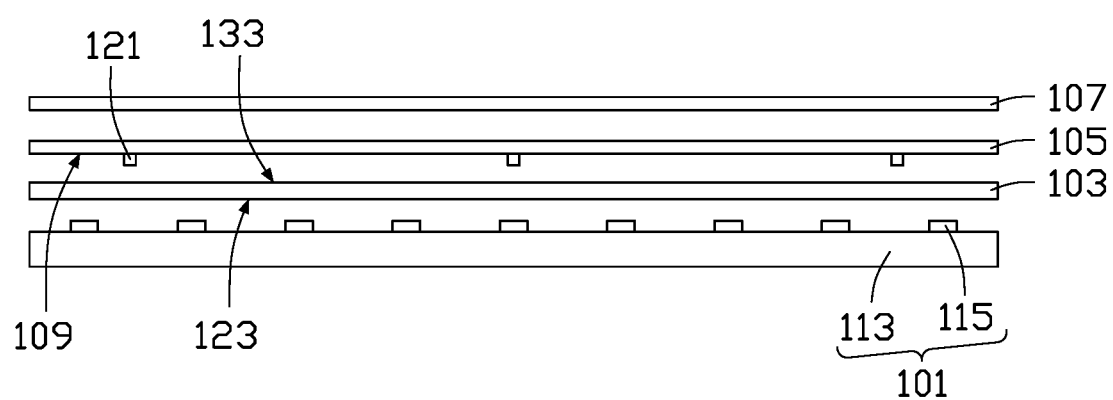
FIG. 1 is an isometric view of a surface light source device in accordance with one embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better. The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like. The references "a plurality of" and "a number of" mean "at least two."

FIG. 1 illustrates a light source device uniformity real-time monitoring system 100 according to one embodiment. The surface light source device 10 includes a light source unit 101, a light guide plate 103, and at least one light uniformity plate.

The light source unit 101 is any one of an LED light source, an incandescent lamp, a fluorescent lamp, or a fluorescent lamp. In this embodiment, the light source unit 101 includes a circuit board 113 and a plurality of LEDs 115 disposed on the circuit board 113. The plurality of LEDs 115 may be arrayed on the circuit board 113. Each LED can be controlled independently, that is, each LED can be independently adjusted to change its brightness.

The light source unit 101 and the light guide plate 103 form an edge-type backlight source or a direct-type backlight source. In this embodiment, the light source unit 101 and the light guide plate 103 form a direct type backlight source.

The light guide plate 103 includes a light incident surface 123 and a light emitting surface 133. The light incident surface 123 can be parallel to the light emitting surface 133 or perpendicular to the light emitting surface 133. In the embodiment, the light incident surface 123 is parallel to the light emitting surface 133. The light incident surface 123 is disposed in a light emitting direction of the light source unit 101.

The at least one light uniformity plate is disposed to be facing the light emitting surface 133 of the light guide plate 103. In this embodiment, the at least one light uniformity plate includes a first light uniformity plate 105 and a second light uniformity plate 107 parallel with the first uniformity plate 105. The first light uniformity plate 105 is disposed to be facing the light emitting surface 133 of the light guide plate 103, and the second light uniformity plate 107 is disposed to be facing the first light uniformity plate 105.

Both the first light uniformity plate 105 and the second light uniformity plate 107 include a light receiving surface 109 facing the light emitting surface 133 for receiving light. In this embodiment, the light receiving surface 109 of the first light uniformity plate 105 is defined with a plurality of zones 111, and each zone 111 is provided with a photosensitive element 121.

Two light uniformity plates are provided, and the photosensitive element 121 is directly disposed on the light receiving surface 109 of the first light uniformity plate 105. A change in intensity of an incident light can be directly reflected on a change of the resistance value of the photosensitive element 121, this improves a monitoring sensitivity of an uniformity of the surface light source device 10. Light emitted from the first uniform plate 105 is further homogenized by the second uniform plate 107, that is, the second uniform plate 107 can reduce influence of the photosensitive element 121 on the emitted light.

Figure 2:
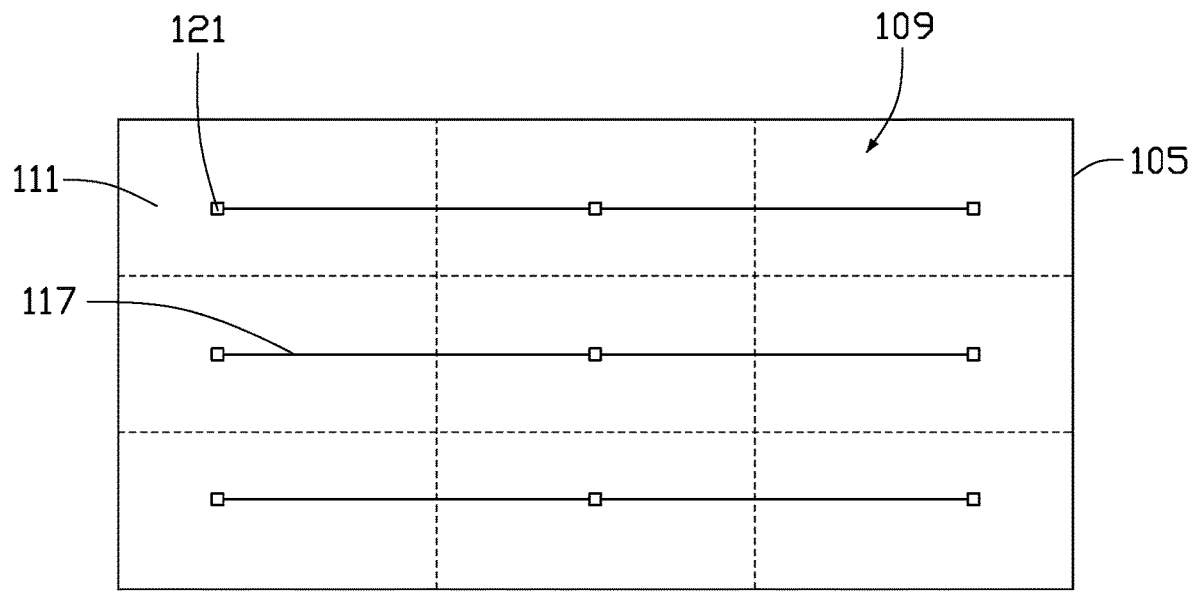
FIG. 2 is view of a photosensitive element distributed on a first uniformity plate of the device of FIG. 1.
Figure 3:
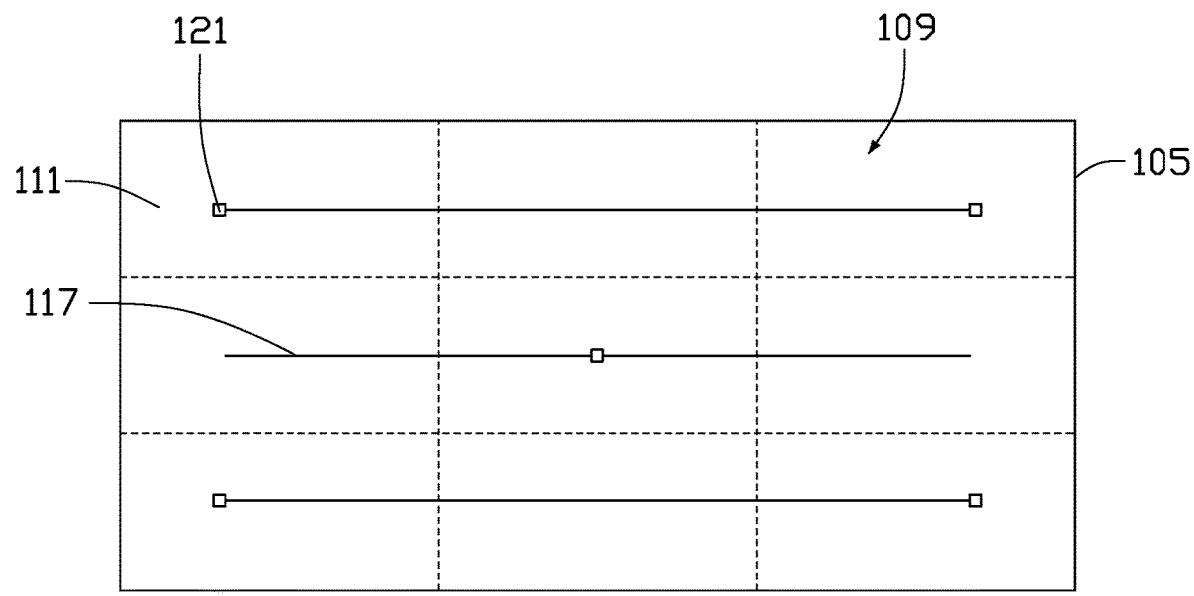
FIG. 3 is another view of the photosensitive element of FIG. 2.

An area of each of the zones 111 of the light receiving surface 109 can be the same or different. The area of each zone 111 shown in FIG. 2 is the same. Therefore, the photosensitive elements 121 are arrayed or evenly distributed on the light receiving surface 109. FIG. 3 shows that each area is different. It can be understood that the photosensitive element 121 can be arranged according to the requirement of monitoring sensitivity.

The photosensitive element 121 is a component made by utilizing the photoelectric effect of a semiconductor to change the resistance according to the intensity of the incident light. Therefore, when intensity of incident light changes, the resistance value of the photosensitive element 121 also changes accordingly. That is, the photosensitive element is a component capable of reflecting an intensity of an incident light.

The photosensitive element 121 is any one of a photo resistor, a photo tube, a photo multiplier tube, a photo transistor, an infrared sensor, or an optical fiber sensor. It can be understood that any component using photoelectricity to change its resistance according to an intensity of the incident light can be used for this purpose.

The surface light source device 10 disclosed can be used in situations with high uniformity requirements, such as MTF and SFR performance testing of a camera.

Figure 4:
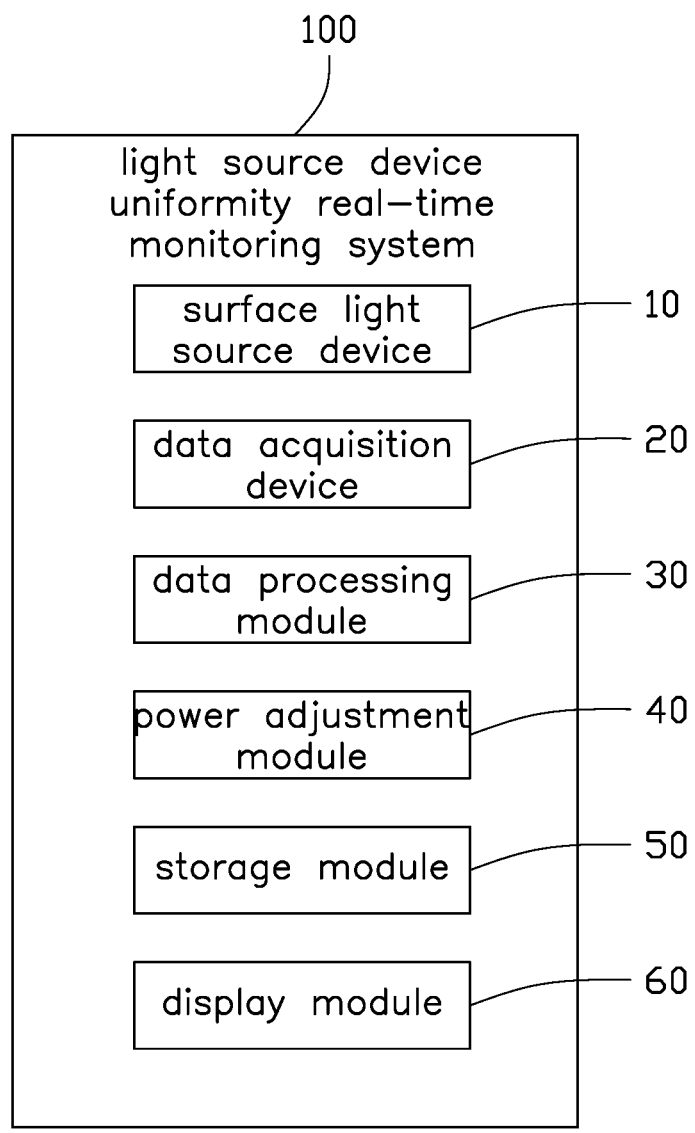
FIG. 4 is a block diagram of a real-time monitoring system of a light source device according to one embodiment of the present disclosure.

FIG. 4 illustrates a light source device uniformity real-time monitoring system 100 according to one embodiment. The light source device uniformity real-time monitoring system 100 includes a surface light source device 10, a data acquisition device 20, a data processing module 30, a power adjustment module 40, a storage module 50, and a display module 60.

The surface light source device 10 includes a light source unit 101, a light guide plate 103, and at least one light uniformity plate.

The light source unit 101 is any one of an LED light source, an incandescent lamp, a fluorescent lamp, or a fluorescent lamp. In this embodiment, the light source unit 101 includes a circuit board 113 and a plurality of LEDs 115 disposed on the circuit board 113. The plurality of LEDs 115 may be arrayed on the circuit board 113. Each LED can be controlled independently, that is, each LED can be independently adjusted for brightness.

The light source unit 101 and the light guide plate 103 form an edge-type backlight source or a direct-type backlight source. In this embodiment, the light source unit 101 and the light guide plate 103 form a direct type backlight. The light guide plate 103 includes a light incident surface 123 and a light emitting surface 133. The light incident surface 123 is disposed in a light emitting direction of the light source unit 101.

The at least one light uniformity plate is disposed facing the light emitting surface 133 of the light guide plate 103. In this embodiment, the at least one light uniformity plate includes a first light uniformity plate 105 and a second light uniformity plate 107 parallel with the first. The first light uniformity plate 105 is disposed to be facing the light emitting surface 133 of the light guide plate 103, and the second light uniformity plate 107 is disposed to be facing the first light uniformity plate 105.

Both the first light uniformity plate 105 and the second light uniformity plate 107 include a light receiving surface 109 for receiving light. In this embodiment, the light receiving surface 109 of the first light uniformity plate 105 is defined with a plurality of zones 111, each zone 111 is provided with a photosensitive element 121.

Two light uniformity plates are provided, and the photosensitive element 121 is directly disposed on the light receiving surface 109 of the first light uniformity plate 105. A change of an intensity of an incident light directly changes the resistance value of the photosensitive element 121, which improves a monitoring sensitivity of an uniformity of the surface light source device 10. Light emitted from the first uniform plate 105 is further homogenized by the second uniform plate 107, that is, the second uniform plate 107 reduces influence of the photosensitive element 121 on the emitted light.

An area of each of the zones 111 of the light receiving surface 109 is the same or different. The area of each zone 111 shown in FIG. 2 is the same. Therefore, the photosensitive elements 121 are arrayed or evenly distributed on the light receiving surface 109. FIG. 3 shows that each area is different. It can be understood that the photosensitive element 121 can be arranged according to the requirement of monitoring sensitivity.

The photosensitive element 121 is a component made by utilizing the photoelectric effect of a semiconductor to change the resistance according to the intensity of the incident light. Therefore, when an intensity of incident light changes, the resistance value of the photosensitive element 121 also changes accordingly. That is, the photosensitive element is a component capable of reflecting an intensity of an incident light.

The photosensitive element 121 is any one of a photo resistor, a photo tube, a photo multiplier tube, a photo transistor, an infrared sensor, or an optical fiber sensor. It can be understood that any component that uses the photoelectric effect of a semiconductor to change its resistance according to an intensity of the incident light can be used for this purpose.

The data acquisition device 20 is electrically connected to each of the photosensitive elements 121 through a wire 117, so as to collect a resistance value of each of the photosensitive elements 121 instantly. That is, each photosensitive element 121 is independently connected to the data acquisition device 20, the wire 117 formed on the light receiving surface 109 can be transparent.

A formula relationship between resistance value of the photosensitive element 121 and an electric current value is pre-established in the data processing module 30 and an electric current preset value is stored in the data processing module 30. The data processing module 30 is configured to receive a resistance value collected by the data acquisition device 20 and perform data processing to obtain a real-time electric current value of each zone 111 corresponding to the resistance value. The data processing module 30 is further configured to compare the real-time electric current value of each zone 111 with the current preset value and to obtain a difference between the real-time current value of each zone 111 and the electric current preset value. The current preset value refers to an electric current value required for LED lighting that meets an ideal uniformity.

The power adjusting module 40 is electrically connected to the data processing module 30 and configured to adjust input power of the light source unit 101 in real time according to the difference compared by the data processing module 30. In this embodiment, the light source unit 101 is a plurality of LEDs 115 provided on the circuit board 113. Adjusting the input power means that light emission brightness of each LED 115 can be adjusted.

When a difference is within a prescribed range, the storage module 50 stores a real-time current value of each zone 111 and stores the difference. When the difference is not within the specified range, it means that the uniformity of the surface light source device 10 does not meet the requirements. Therefore, an input power of the light source unit 101 can be adjusted by the power adjustment module 40, altering brightness of the light incident on the light receiving surface 109. The resistance value of the photosensitive element 121 provided on the light receiving surface 109 thus changes, and the current value corresponding to the real-time resistance value changes accordingly, until the difference between the real-time current value and the current preset value within the specified range.

The display module 60 is electrically connected to the data processing module 30, the data acquisition module 20, and the storage module 50 to display the data collected by the data acquisition module 20 and the data processed by the data processing module 30. The display module 60 may be any type of displays.

Figure 5:
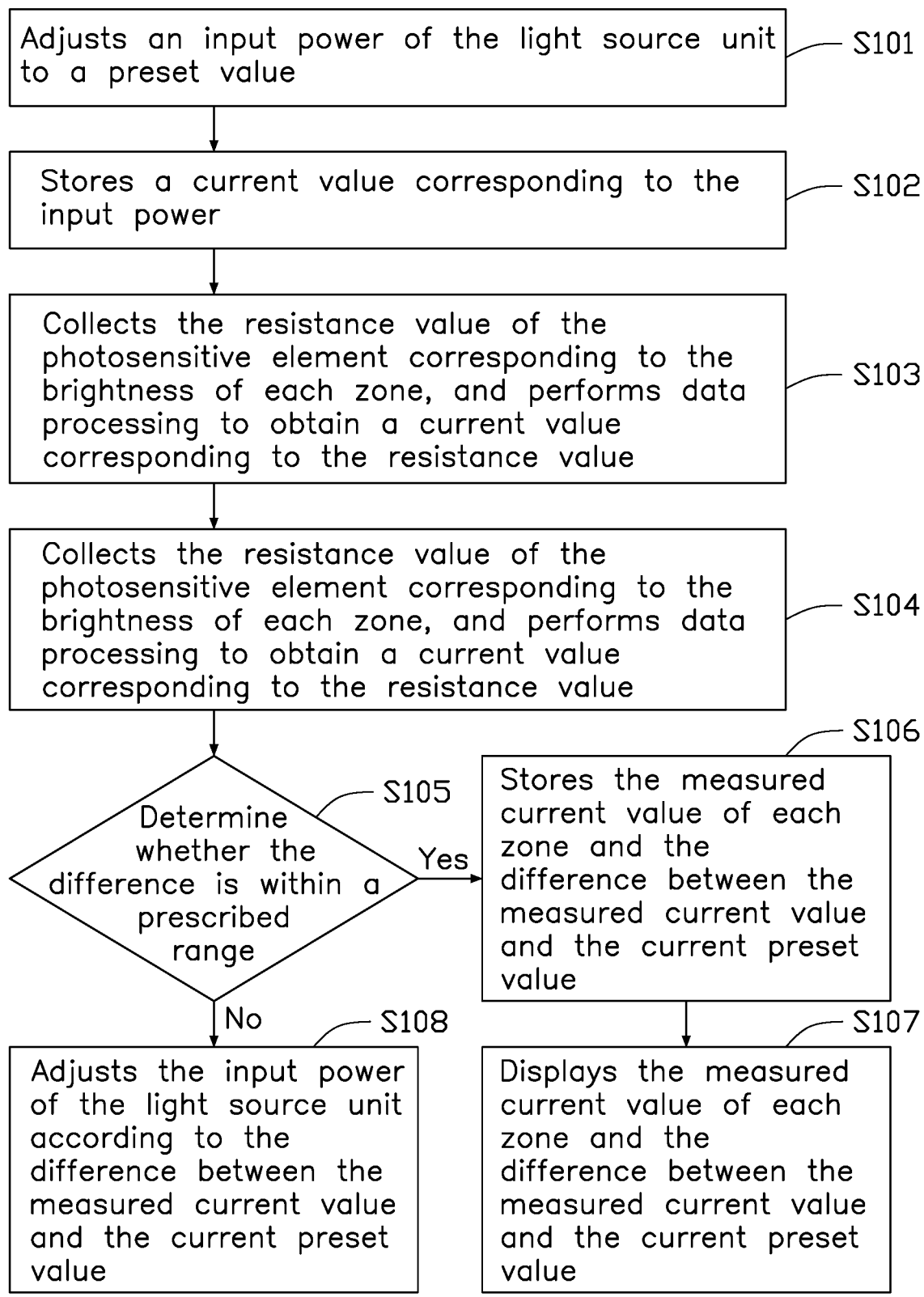
FIG. 5 is a flowchart of a method of the present disclosure which is applicable to the system of FIG. 4.

Referring to FIG. 5, a method for operating the light source device uniformity real-time monitoring system 100 is:

Step S101: an input power of the light source unit 101 is adjusted to a preset value.

Step S102: the storage module 50 stores a current value corresponding to the input power;

Step S103: the data acquisition device 20 collects the resistance value of the photosensitive element 121 corresponding to the brightness of each zone, and performs data processing to obtain an electric current value corresponding to the resistance value.

Step S104: the data processing module 30 compares a difference between the real-time current value of each zone 111 and an electric current preset value.

Step S105: determine whether the difference is within a prescribed range. If the difference within the specified range, S106 is performed. If it is not within the specified range, S108 is first performed and then to perform steps 103 to step 107 again.

Step S106: the storage module 50 stores the measured current value of each zone 111 and the difference between the measured current value and the current preset value.

Step S107: the display module 60 displays the measured current value of each zone 111 and the difference between the measured current value and the current preset value.

Step S108: the power adjustment module 40 adjusts the input power of the light source unit according to the difference between the measured current value and the current preset value.

In summary, the surface light source device 10 is provided with a plurality of the photosensitive element 121 on the light receiving surface 109 of the light homogenizing plate 105, when an intensity or brightness of the incident light changes, the resistance value of the photosensitive element 121 also changes accordingly, and an intensity or brightness of the incident light can be monitored based on the resistance value or the current value corresponding to the resistance value.

About the light source device uniformity real-time monitoring system 100, when the incident light changes, the resistance value of the photosensitive element 121 also changes accordingly, so that it can be adjusted according to the difference between the current value corresponding to the resistance value and the current preset value. The input power of the light source unit 101 is used to further adjust the intensity of the emitted light to achieve the purpose of adjusting the uniformity of the surface light source device 10, and the goal of real-time monitoring and adjusting the uniformity of the surface light source device 10 in real time according to the monitoring structure is achieved.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A surface light source device comprising: a light source unit; a light guide plate comprising a light incident surface and a light emitting surface, the light incident surface is in a light emitting direction of the light source unit; and at least one light uniformity plate, wherein the at least one light uniformity plate comprises a light receiving surface facing the light emitting surface, and the light receiving surface is provided with a plurality of photosensitive elements.

2. The surface light source device of claim 1, wherein the at least one light uniformity plate comprises a first light uniformity plate and a second light uniformity plate parallel with the first uniformity plate, and the first light uniformity plate faces the light emitting surface of the light guide plate, and the second light uniformity plate faces the first light uniformity plate.

3. The surface light source device of claim 2, wherein the light receiving surface of the first light uniformity plate defines a plurality of zones, and each zone is provided with one of the plurality of the photosensitive element.

4. The surface light source device of claim 3, wherein the photosensitive element is select from any one of a photo resistor, a photo tube, a photo multiplier tube, a photo transistor, an infrared sensor, or an optical fiber sensor.

5. The surface light source device of claim 3, wherein the light source unit and the light guide plate form an edge-type backlight source or a direct-type backlight source; and the light source unit is any one of an LED light source, an incandescent lamp, a fluorescent lamp, or a fluorescent lamp.

6. A light source device uniformity real-time monitoring system comprising: a surface light source device comprising: a light source unit; a light guide plate comprising a light incident surface and a light emitting surface, the light incident surface is in a light emitting direction of the light source unit; and at least one light uniformity plate, wherein the at least one light uniformity plate comprises a light receiving surface facing the light emitting surface, the light receiving surface is provided with a plurality of photosensitive elements; a data acquisition device electrically connected to each of the photosensitive elements, and adapted to collecting a resistance value of each of the photosensitive elements in real time; a data processing module electrically connected to the data acquisition device and configured to receive the resistance value collected by the data acquisition device and perform data processing to obtain an electric current value of each of the plurality of the photosensitive elements corresponding to the resistance value in real time; and a power adjusting module electrically connected to the data processing module configured to adjust input power of the light source unit in real time according to the electric current value.

7. The light source device uniformity real-time monitoring system of claim 6, wherein the at least one light uniformity plate comprises a first light uniformity plate and a second light uniformity plate parallel with the first uniformity plate, and the first light uniformity plate faces the light emitting surface of the light guide plate, and the second light uniformity plate faces the first light uniformity plate.

8. The light source device uniformity real-time monitoring system of claim 7, wherein the light receiving surface of the first light uniformity plate defines a plurality of zones, and each zone is provided with one of the plurality of the photosensitive element.

9. The light source device uniformity real-time monitoring system of claim 8, wherein the photosensitive element is select from any one of a photo resistor, a photo tube, a photo multiplier tube, a photo transistor, an infrared sensor, or an optical fiber sensor.

10. The light source device uniformity real-time monitoring system of claim 9, wherein the light source unit and the light guide plate form an edge-type backlight source or a direct-type backlight source; and the light source unit is any one of an LED light source, an incandescent lamp, a fluorescent lamp, or a fluorescent lamp.

11. The light source device uniformity real-time monitoring system of claim 10, wherein an area of each of the plurality of zones on the light receiving surface is same or different.

12. The light source device uniformity real-time monitoring system of claim 11, wherein a formula relationship between a resistance value of the photosensitive element and an electric current value is pre-established in the data processing module and an electric current preset value is stored in the data processing module, the data processing module further configured to compare the electric current value of each of the plurality of zones in real time with the electric current preset value and to obtain a difference between the electric current value of each of the plurality of zones in real time and the electric current preset value.

13. The light source device uniformity real-time monitoring system of claim 12, further comprises a storage module configured for storing an electric current value of each of the plurality of zones in real time and stores a difference between the real-time electric current value and the electric current preset value when the difference is within a prescribed range.

14. The light source device uniformity real-time monitoring system surface light source device of claim 13, further comprises a display module electrically connected to the data processing module, the data acquisition module and the storage module, the display module displaying the electric current value of each of the plurality of zones in real time and a difference between the real-time electric current value and the electric current preset value.

* * * * *